United States Patent Office 3,146,229
Patented Aug. 25, 1964

3,146,229
2-SULFANILAMIDO-4-PHENOXY-1,3,5-TRIAZINE
Royal A. Cutler, Sand Lake, N.Y., assignor to Sterling
Drug Inc., New York, N.Y., a corporation of Delaware
No Drawing. Filed Oct. 29, 1962, Ser. No. 233,888
1 Claim. (Cl. 260—239.7)

This invention relates to novel disubstituted-1,3,5-triazines, to methods for preparing said compounds, and to methods for converting certain of said compounds to other useful disubstituted-1,3,5-triazines.

One aspect of this invention relates to valuable new 2,4-di-(Y—O—)-6-(H—)-1,3,5-triazines, where Y is lower alkyl or phenyl. In the free base form, these compounds have the structural formula

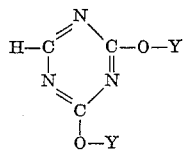

Formula I where Y has the same meaning indicated above. When Y is lower alkyl, I generally prefer the radicals having about 1-6 carbon atoms, for instance, methyl, ethyl, isopropyl, n-propyl, n-butyl, n-hexyl, and the like. The 2,4-di(lower alkoxy)-6-(H—)-1,3,5-triazines of my invention are the free base forms represented by Formula I above and the acid-addition salts of said bases fully equivalent therewith which are obtained by reacting the bases with organic and inorganic acids, such as hydrochloric acid, phosphoric acid, methanesulfonic acid, acetic acid, and the like. The 2,4-diphenoxy-1,3,5-triazine free base form is less basic than the free base forms of the corresponding dialkoxy compounds and does not dissolve readily in dilute acids.

In accordance with my invention, a convenient process for obtaining the 2,4-di-(Y—O—)-6-(H—)-1,3,5-triazines comprises dehalogenating the corresponding 2,4-di-(Y—O—)-6-halo-1,3,5-triazines by treatment with hydrogen in the presence of a metal hydrogenation catalyst and a suitable acid-acceptor, thus effecting the reaction represented by the equation:

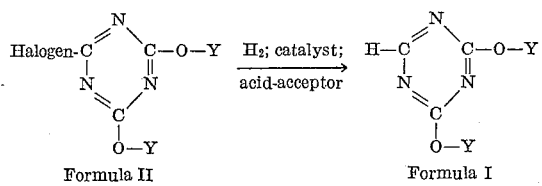

Formula II                           Formula I followed, if desired, by conversion of the free base thus produced to an acid-addition salt. The hydrogenation catalyst in this method can be, for example, palladium, Raney nickel, and the like. The acid-acceptor is any suitable base such as sodium bicarbonate or triethylamine.

I have discovered that my novel 2,4-di-(Y—O—)-6-(H—)-1,3,5-triazines are especially useful and valuable as starting materials for the preparation of a variety of biologically active substances. Thus, ammonolysis by treatment with ammonia or a primary amine, in the presence of an acid catalyst, replaces one or both, as desired, of the ether groupings, Y—O—, to yield the corresponding products having in the free base forms the respective Formulas III and IV below:

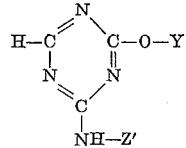 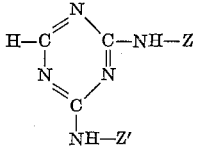

Formula III           Formula IV where Z and Z' are the same or different members of the group consisting of hydrogen, alkyl, aryl, and heteryl. As ammonolysis agents there can be used, for example: ammonia, alkylamines such as methylamine, ethylamine, isobutylamine, n-hexylamine, and the like; arylamines such as aniline, haloanilines, alkoxyanilines, alkylmercaptoanilines, alkylsulfinylanilines, alkylsulfonylanilines, alkylmercapto-haloanilines, alkylsulfinyl-haloanilines, alkylsulfonyl-haloanilines, 4-acetylaniline, 4-sulfamylaniline (sulfanilamide), 4-biphenylamine, 1-naphthylamine, and the like; and heterylamines such as aminopyridines, aminothiazoles, aminoquinolines, aminopyrimidines, and the like. When the acid used as a catalyst in the ammonolysis reaction is a strong acid, for example hydrochloric acid, only a relaitvely small amount should be used. However, when a weak acid, such as acetic acid is employed, either large or small amounts can be used satisfactorily, and in many instances it is convenient to employ the ammonolytic agent in the form of its acetate salt to serve both as reactant and source of catalytic acid.

Hydrolysis of my new 2,4-di-(Y—O—)-6-(H—)-1,3,5-triazines replaces one or both, as desired, of the ether groupings, Y—O—, by hydroxyl to yield 2-(Y—O—)-4-hydroxy-6-(H—)-1,3,5-triazines or 2,4-dihydroxy-1,3,5-triazine, having the respective free acid Formulas V and VI below:

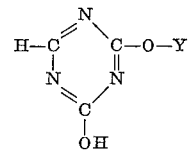 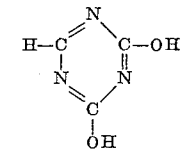

Formula V            Formula VI

Hydrolysis can be effected by use of either acid or base catalyzed hydrolytic conditions.

Ammonolysis of one ether grouping and hydrolysis of the other ether grouping in my new 2,4-di-(Y—O—)-6-(H—)-1,3,5-triazines yields the corresponding 2-(amino or substituted amino)-4-hydroxy-6-(H—)-1,3,5-triazines having in the non-salt form the following structural formula:

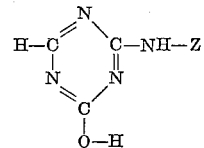

Formula VII

Certain of the compounds defined by Formula IV above are old compounds; for instance, the 2-amino-4-(halophenyl-amino)-1,3,5-triazines and the 2-amino-4-(alkoxyphenylamino)-1,3,5-triazines are known diuretic agents. 2,4-dihydroxy-1,3,5-triazine is a known compound of biological interest.

The compounds having in free base form Formula IV wherein Z is hydrogen and Z' is alkylmercaptophenyl, alkylsulfinylphenyl, alkylsulfonylphenyl, alkylmercaptohalophenyl, alkylsulfinyl-halophenyl, and alkylsulfonyl-halophenyl, and the compounds represented in free acid form by Formula VII are novel diuretic compounds which are the joint invention of Royal A. Cutler and Samual Schalit and are claimed in their U.S. application Serial No. 14,551, filed March 14, 1960. The compounds of said group within Formula IV, which have in the free base form the structural formula

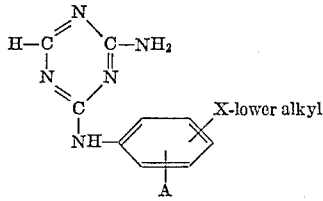

Formula VIII wherein A is a member of the group consisting of hydrogen and halogen, and X is —S—, —SO—, or —SO$_2$—, are conveniently obtained in accordance with the process of my instant invention by interacting a 2,4-di-(Y—O—)-6-(H—)-1,3,5-triazine with approximately one molecular equivalent of a (lower alkyl-X—)aniline or a (lower alkyl-X—)haloaniline, and ammonolyzing the 2-(Y—O—)-4-(lower alkyl-X-phenylamino or lower alkyl-X-halophenylamino)-6-(H—)-1,3,5-triazine thereby produced by treatment with ammonia in the presence of an acid catalyst.

The 2-(Z—NH—)-4-hydroxy-6-(H—)-1,3,5-triazines represented in the free acid form by Formula VII are conveniently obtained in accordance with my invention by interacting a 2,4-di-(Y—O—)-6-(H—)-1,3,5-triazine with approximately one molecular equivalent of an ammonolyzing agent having the formula Z—NH$_2$ in the presence of an acid catalyst, and hydrolyzing the 2-(Y—O—)-4-(Z—NH—)-6-(H—)-1,3,5-triazine thus obtained.

As will be appreciated, the compounds of Formula III are useful as intermediates to the compounds of Formulas IV and VII; and the compounds of Formula V are useful as intermediates to the compound of Formula VI.

As still another aspect of the present invention, novel 2-sulfanilamido-4-(Y—O—)-6-(H—)-1,3,5-triazines, which can be represented in acidic form by the structural formula

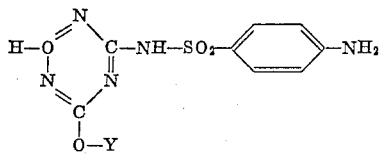

Formula IX are obtained by interacting a 2,4-di-(Y—O—)-6-(H—)-1,3,5-triazine with approximately one molecular equivalent of an N$^1$-alkali metal salt of sulfanilamide. For example, interaction of 2,4-dimethoxy-1,3,5-triazine with approximately one molecular equivalent of the N$^1$-sodium salt of sulfanilamide yields 2-sulfanilamido-4-methoxy-1,3,5-triazine. Like the parent compound sulfanilamide, the acid forms (Formula IX) of these 2-sulfanilamido-4-(Y—O—)-6-(H—)-1,3,5-triazines react with bases, for instance alkali metal hydroxides such as sodium hydroxide, to form salts, owing to the acidity of the N$^1$-hydrogen. The new 2-sulfanilamido-4-(Y—O—)-6-(H—)-1,3,5-triazines of my invention are the free acid forms of Formula IX above and the salts thereof, the salts being the full equivalent of the acid forms. These compounds of my invention have antibacterial properties and are useful as antibacterial agents. Moreover, the 2-sulfanilamido-4-methoxy and ethoxy-6-(H—)-1,3,5-triazines have herbicidal properties and are useful as herbicidal agents.

If desired, the 2-sulfanilamido-4-methoxy-6-(H—)-1,3,5-triazine can be conveniently used as a starting material for preparation of the other 2-sulfanilamido-4-lower alkoxy-6-(H—)-1,3,5-triazines of my invention by interaction with an alkali metal lower alkoxide other than an alkali metal methoxide, whereby the 4-methoxy group is replaced with the lower alkoxy group present in the alkali metal lower alkoxide.

My invention is illustrated by the following examples without, however, being limited thereto.

EXAMPLE 1

*2,4-Dimethoxy-1,3,5-Triazine*

A mixture of 87.7 g. of 2,4-dimethoxy-6-chloro-1,3,5-triazine, 45 g. of sodium bicarbonate, 550 ml. of methanol, 150 ml. of water, and 5 g. of palladium-on-charcoal catalyst (containing 0.5 g. of palladium chloride) was hydrogenated at an initial hydrogen pressure of 525 pounds per square inch at room temperature (about 25° C.) for four hours, with shaking. The final hydrogen pressure was 450 pounds per square inch. The catalyst was then removed by filtration, and the filtrate was evaporated under reduced pressure on a warm water-bath to yield a semi-solid residue. This residue was dissolved in hot petroleum ether and the resulting solution was filtered while hot. The filtrate was cooled and the solid which separated from solution was collected on a filter. There was thus obtained 37.3 g. of solid which was recrystallized from petroleum ether to yield 25.1 g. of white solid. This product, which melted at 58–60° C., was 2,4-dimethoxy-1,3,5-triazine (Formula I:

Y=CH$_3$—O—)

having the molecular formula C$_5$H$_7$N$_3$O$_2$.

EXAMPLE 2

*2,4-Dimethoxy-1,3,5-Triazine*

Proceeding in a manner similar to that described in Example 1, a mixture of 80.1 g. of 6-chloro-2,4-dimethoxy-1,3,5-triazine, 43 g. of sodium bicarbonate, 500 ml. of methanol, 100 ml. of water, and 5 g. of palladium-on-charcoal catalyst (containing 0.5 g. of palladium chloride) was hydrogenated at an initial hydrogen pressure of 535 pounds per square inch at room temperature for seven hours to yield 47.3 g. of white solid melting at 55–59° C. This product which was crude 2,4-dimethoxy-1,3,5-triazine, was recrystallized from petroleum ether to yield 38.1 g. of the purified compound.

EXAMPLE 3

*2,4-Diethoxy-1,3,5-Triazine*

A mixture of 3.29 g. of 6-chloro-2,4-diethoxy-1,3,5-triazine, 1.36 g. of sodium bicarbonate slurried in 50 ml. of water, 200 g. of isopropyl alcohol, 0.2 g. of palladium chloride, and 2 g. of charcoal was hydrogenated at an initial hydrogen pressure of 46 pounds per square inch at room temperature for four hours, with shaking. The total drop in hydrogen pressure was 10 pounds per square inch, virtually all of this drop having occurred within the first two hours. The catalyst was then removed by filtration, and the colorless filtrate was evaporated to dryness under reduced pressure on a warm water bath. The white solid obtained as a residue was slurried in water to remove sodium chloride, and the slurry was filtered. The solid thus collected was washed with water and dried. There was thus obtained 1.2 g. of white crystalline solid which was recrystallized from petroleum ether with charcoaling to yield 0.78 g. of glistening white needles which melted at 49–51° C. This product was 2,4-diethoxy-1,3,5-triazine, (Formula I: Y=C$_2$H$_5$—O—), having the molecular formula

C$_7$H$_{11}$N$_3$O$_2$

EXAMPLE 4

2,4-Diphenoxy-1,3,5-Triazine

A mixture of 45 g. of 6-chloro-2,4-diphenoxy-1,3,5-triazine dissolved in 400 ml. of dioxane, 12.6 g. of sodium bicarbonate slurried in 50 ml. of water, 1 g. of palladium chloride, and 10 g. of charcoal was hydrogenated at an initial hydrogen pressure of 550 pounds per square inch at 28° C. for three and three-quarters hours, with shaking. The catalyst was then removed by filtration, and the filtrate was evaporated to dryness under reduced pressure on a warm water-bath. The solid residue thus obtained was ground in a mortar, washed with water, and dried. The resulting solid, which weighed 39 g., was recrystallized from 400 ml. of petroleum ether, with charcoaling. There was obtained in this manner 28 g. of white solid which melted at 105–107° C. after softening at 102° C. This product was 2,4-diphenoxy-1,3,5-triazine (Formula I: Y—O—=$C_6H_5$—O—), having the molecular formula $C_{15}H_{11}N_3O_2$. By recrystallization of this compound from isopropyl alcohol and then from petroleum ether, the melting point was raised to 120–122° C. when a sample was heated very slowly, but a similar sample melted completely when heated rapidly to 112° C.

EXAMPLE 5

2-Methoxy-4-(4-Chlorophenylamino)-1,3,5-Triazine

A mixture of 10 g. of 2,4-dimethoxy-1,3,5-triazine, 9.1 g. of 4-chloroaniline, and 4.25 g. (4.4 ml.) of acetic acid was heated at 120° C. on an oil bath for about one hour. The reaction mixture was removed from the oil bath and after a few minutes was cooled and poured into ice water. The solid which separated from solution was collected on a filter and washed with water. The solid was then dissolved in hot ethanol, and after adding decolorizing charcoal the solution was filtered while hot. The filtrate was chilled and the crystalline solid which separated from solution was collected on a filter. This product, which weighed 5.7 g. and melted at 168–171° C., was 2-methoxy-4-(4-chlorophenylamino)-1,3,5-triazine, having the structural formula

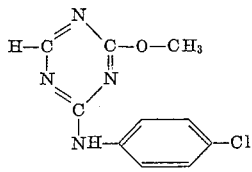

EXAMPLE 6

2-Phenoxy-4-(4-Methylmercaptophenylamino)-1,3,5-Triazine

A mixture of 5 g. of 2,4-diphenoxy-1,3,5-triazine, 3.32 g. of 4-methylmercaptoaniline hydrochloride, and 1.55 g. of fused sodium acetate was heated in a 25 ml. round bottomed flask in an oil bath at 123–133° C. for one hour. Initially, an exothermic reaction occurred as indicated by a 10° C. rise in temperature of the reaction mixture above the bath temperature, and then the temperature of the reaction mixture gradually fell back to that of the bath. A distinct odor of phenol become evident as the reaction mixture gradually liquefied and then later partially solidified. At the end of the reaction period, water was added to the pasty product, and the mixture was allowed to stand overnight, during which time the pasty mass crystallized. The mixture was filtered and the tan solid thus collected was washed with water and dried to give 11.5 g. of product. This solid was purified by dissolving it in 150 ml. of nitromethane, filtering the resulting solution to remove a small amount of undissolved material, and chilling the filtrate to cause separation of 1.5 g. of solid melting at 162–164° C. Recrystallization of this solid from 20 ml. of acetonitrile yielded a white solid which melted at 161–162° C. This product was 2-phenoxy-4-(4-methylmercaptophenylamino)-1,3,5-triazine, having the structural formula

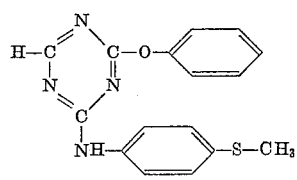

EXAMPLE 7

2-Amino-4-(4-Chlorophenylamino)-1,3,5-Triazine

A mixture of 1.2 g. of 2-methoxy-4-(4-chlorophenylamino)-1,3,5-triazine and 2.4 g. of ammonium acetate was heated for two hours at 135–140° C. During this heating period, the mixture gradually became pasty, then liquefied, and finally became substantially solidified. This white product was cooled and slurried in water, and the mixture was filtered. The solid thus collected was washed with water and dried. The resulting product, which weighed 0.97 g., was recrystallized from dioxane to yield a white crystalline solid which melted at 262–264° C. This product was 2-amino-4-(4-chlorophenylamino)-1,3,5-triazine, having the structural formula

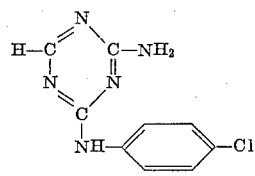

This product is a known compound useful as a diuretic agent, particularly in the form of its hydrochloride.

EXAMPLE 8

2-Hydroxy-4-(4-Chlorophenylamino)-1,3,5-Triazine

A mixture of 8.0 g. of 2-methoxy-4-(4-chlorophenylamino)-1,3,5-triazine, 50 ml. of water, and 8 ml. of 10 percent aqueous sodium hydroxide solution was heated to reflux temperature, 10 ml. more of 10 percent aqueous sodium hydroxide solution was added, and heating was continued at reflux temperature. Almost all of the solid in the mixture dissolved, and the resulting solution was filtered. The filtrate was heated to redissolve some solid which had separated as the solution cooled, and then sufficient acetic acid was added to make the solution acidic. The acidified solution was cooled and the solid which separated from solution was collected on a filter. There was thus obtained 5.0 g. of the diuretic compound 2 - hydroxy-4-(4-chlorophenylamino)-1,3,5-triazine, having the structural formula

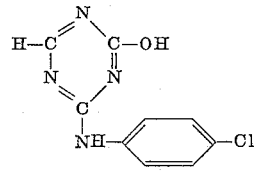

which melted at 295–297° C. with decomposition.

EXAMPLE 9

2-Amino-4-(4-Lower Alkylmercaptophenylamino)-1,3,5-Triazines

The above-designated products, which are diuretic agents, are prepared as follows. Using the procedure described above in Example 5, but substituting 11.1 g. of 4-ethylmercaproaniline for the 4-chloroaniline, there is obtained 2-methoxy - 4 - (4-ethylmercaptophenylamino)-1,3,5-triazine. Ammonolysis of this compound by treatment with ammonium acetate by a procedure similar to that described above in Example 7, there is obtained 2-amino - 4 - (4-ethylmercaptophenylamino)-1,3,5-triazine, which metls at 175–177° C.

Similarly, use of 11.9 g. of 4-n-propylmercaptoaniline in the first step above yields 2-methoxy-4-(4-n-propylmercaptophenylamino)-1,3,5-triazine, which is ammonolyzed by ammonium acetate to yield 2-amino-4-(4-n-propylmercaptophenylamino)-1,3,5-triazine, M.P. 157–158° C.; use of 12.9 g. of 4-n-butylmercaptoaniline in the first step yields 2-methoxy-4-(4-n-butylmercaptophenylamino)-1,3,5-triazine, which is ammonolyzed by ammonium acetate to yield 2-amino-4-(4-n-butylmercaptophenylamino)-1,3,5-triazine, M.P. 161–162° C.

2-amino-4-(4-methylmercaptophenylamino)-1,3,5 - triazine was prepared as follows: A mixture of 0.5 g. of 2-(4-methylmercaptophenylamino)-4-phenoxy-1,3,5 - triazine and 0.55 g. of ammonium acetate was heated by means of an oil bath at 135–140° C. for two hours. The reaction mixture gradually became liquid and the odor of phenol was plainly evident. After cooling, the solid reaction mixture was broken up, washed well on a filter with water, and dried. There was thus obtained 0.36 g. of light tan solid which melted at 206–208° C. Recrystallization of this product from six volumes of dioxane yielded a white solid which melted at 210–211° C. This product was 2-amino-4-(4-methylmercaptophenylamino)-1,3,5-triazine.

All of the 2-amino-4-(4-lower alkylmercaptophenylamino)-1,3,5-triazines obtained in the manner described above are in the free base form, and these bases react readily with organic and inorganic acids, for instance hydrochloric acid and citric acid, to form the corresponding acid addition salts.

EXAMPLE 10

2-Amino-4-(4-Sulfamylphenylamino)1,3,5-Triazine

Proceeding in the manner described above in Example 5, but substituting 12.2 g. of p-sulfamylaniline (sulfanilamide) for the 4-chloroaniline, there is obtained as the product 2-methoxy-4-(4-sulfamylphenylamino)-1,3,5-triazine. By ammonolysis of this compound by treatment with ammonium acetate by a procedure similar to that described above in Example 7, there is obtained 2-amino-4-(4-sulfamylphenylamino)-1,3,5-triazine, M.P. 283–284° C. This is a known compound having diuretic properties.

EXAMPLE 11

2,4-Dihydroxy-1,3,5-Triazine

Hydrolysis of 2,4-dimethoxy-1,3,5-triazine by heating it with concentrated hydrochloric acid for a few minutes, yields 2,4-dihydroxy-1,3,5-triazine,

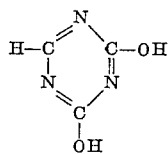

M.P. 272° C., a known compound of biological interest.

EXAMPLE 12

2-Sulfanilamido-4-Methoxy-1,3,5-Triazine

A mixture of 14.1 g. of 2,4-dimethoxy-1,3,5-triazine, 17.2 g. of sulfanilamide, 2.53 g. of sodium, and 100 ml. of methanol was refluxed on a steam bath for twenty-six hours, moisture being excluded by use of a drying tube. The reaction mixture was then evaporated under reduced pressure on a warm water bath to yield as a residue 34 g. of white solid. This solid was dissolved in 400 ml. of water to form a cloudy solution which was alkaline to pH indicator paper. The solution was made slightly acidic by gradually adding dilute acetic acid to it with stirring. The white solid which separated from solution was collected on a filter, washed with water, and dried. This solid, which weighed 24 g., was dissolved in 200 ml. of hot acetonitrile and the resulting solution was filtered while hot after addition of decolorizing charcoal. The filtrate was chilled overnight and then the solid which had separated from solution was collected on a filter, washed with a small amount of acetonitrile, and dried. There was thus obtained 18.5 g. of white crystalline solid which melted at 196–197° C. with decomposition. This product was 2-sulfanilamido-4-methoxy - 1,3,5 - triazine, having the structural formula

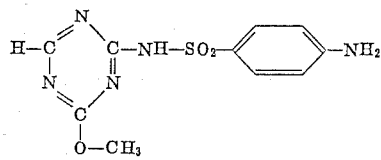

It was soluble in a mixture of dilute sodium hydroxide and water (in proportion of 0.36 ml. of 0.5 N aqueous sodium hydroxide solution and 0.14 ml. of water) to the extent of 10 percent; the pH of a 1 percent solution in this dilute alkali being 12.0. When an alkaline solution thus obtained was adjusted to pH 7 by addition of 0.1 N hydrochloric acid, no precipitate was formed.

EXAMPLE 13

2-Sulfanilamido-4-Ethoxy-1,3,5-Triazine

Proceeding in the manner described in Example 12, but substituting 16.9 g. of 2,4-diethoxy-1,3,5-triazine for the 2,4-dimethoxy-1,3,5-triazine and 120 ml. of absolute ethanol for the methanol, there is obtained as the product 2-sulfanilamido-4-ethoxy-1,3,5-triazine, melting at 210–212° C. and having the structural formula

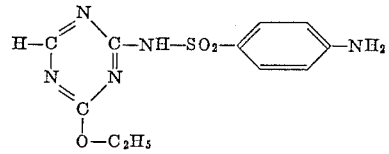

This compound is also produced by alcoholysis of 2-sulfanilamido-4-methoxy-1,3,5-triazine with ethanol in the presence of sodium ethoxide, in the following manner: To 50 ml. of anhydrous ethyl alcohol in a 100 ml. round bottomed flask fitted with a reflux condenser, there was added 0.08 g. of sodium. After all of the sodium had reacted, 0.72 g. of 2-sulfanilamido-4-methoxy-1,3,5-triazine was added and the resulting solution was heated at reflux temperature for one and one-half hours on a steam bath. Evaporation of the ethyl alcohol from the reaction mixture gave a white residue, which was then dissolved in 30 ml. of water. The resulting solution was made slightly acidic by addition of dilute acetic acid. The white solid thus precipitated was collected on a filter, washed with water, and dried to give 0.42 g. of white solid. Recrystallization of this solid from 8 ml. of acetonitrile yielded 0.31 g. of white solid which melted at 210–212° C. This product was 2-sulfanilamido-4-ethoxy-1,3,5-triazine.

EXAMPLE 14

2-Sulfanilamido-4-Phenoxy-1,3,5-Triazine

A solution of sodium phenoxide was prepared by dissolving 9.4 g. of phenol in 100 ml. of anhydrous dioxane and adding 1.15 g. of sodium. When the sodium had disappeared, 8.6 g. of sulfanilamide was added followed by the addition of a solution of 13.3 g. of 2,4-diphenoxy-1,3,5-triazine in 100 ml. of anhydrous dioxane. The resulting slurry was stirred and refluxed (while protecting the reaction mixture from moisture by means of a drying tube) for twelve hours, and then the excess dioxane was removed by distillation under reduced pressure. The solid residue which remained was dissolved in 250 ml. of water and the dark solution thus obtained was filtered after addition of decolorizing charcoal. On making the filtrate slightly acid with dilute acetic acid, a tan solid was precipitated from solution. This solid was collected on a filter, washed with water, and dried. There was thus obtained 18.5 g. of solid which was purified by dissolving it in 250 ml. of hot acetonitrile, filtering the hot solution after addition of decolorizing charcoal, and cooling the filtrate. The solid which separated from solution was collected on a filter and dried. There was thus obtained 4 g. of white fluffy needles. This product was 2-sulfanilamido-4-phenoxy-1,3,5-triazine, having the structural formula

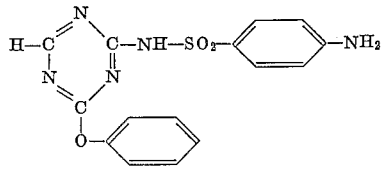

This product melted completely when a melting point capillary tube containing a sample of it was dropped into a bath preheated to 275° C. When the temperature of another sample of the product was raised slowly it sintered and shrank at temperatures below 275° C. and appeared to change crystalline form, but it failed to melt even when the bath was raised to 300° C.

EXAMPLE 15

A solution of sodium n-propoxide was prepared by placing 1.06 g. of sodium in 125 ml. of anhydrous n-propyl alcohol, and to this solution there was added 9.5 g. of 2-sulfanilamido-4-methoxy-1,3,5-triazine. The resulting mixture was refluxed for one and one-half hours. The hot reaction mixture was filtered, the solid thus collected was dissolved in 100 ml. of water, and this aqueous solution was made slightly acidic by addition of acetic acid. The solution was cooled overnight in a refrigerator, and then the solid which had separated from solution was collected on a filter, washed with cold water, and dried. This product, which weighed 7.9 g., was recrystallized from 300 ml. of acetonitrile with charcoaling. There was thus obtained 5 g. of 2-sulfanilamido-4-n-propoxy-1,3,5-triazine as a white powder which melted at 201–206° C. Its solubility in water was less than 0.25 percent and its solubility in ethyl alcohol was less than 1 percent.

EXAMPLE 16

Processing in a manner similar to that described above in Example 15, 1.3 g. of sodium was placed in 125 ml. of anhydrous ethyl alcohol, and the resulting solution of sodium ethoxide was interacted with 12.0 g. of 2-sulfanilamido - 4 - methoxy-1,3,5-triazine to produce 9.4 g. of 2-sulfanilamido-4-ethoxy-1,3,5-triazine as an off-white powder which melted at 210–211° C.

2-sulfanilamido - 4 - methoxy-1,3,5-triazine, 2-sulfanilamido - 4 - ethoxy-1,3,5-triazine, 2 - sulfanilamido-4-n-propoxy - 1,3,5 - triazine, and 2-sulfanilamido-4-phenoxy-1,3,5-triazine prepared as described above were found to have antibacterial properties and to be useful as antibacterial agents. For example, each of these compounds, at test concentration levels of 1.0 mg. per ml. and 5.0 mg. per ml., was active against the growth of Streptococcus pyogenes C–203, for instance when tested in vitro by the conventional cup plate test.

2-sulfanilamido - 4 - methoxy - 1,3,5 - triazine and 2 - sulfanilamido - 4 - ethoxy - 1,3,5 - triazine were found in pre-emergence tests to have useful herbicidal properties, the methoxy compound being the more active species in this regard. These tests on the methoxy species and the ethoxy species were carried out as follows. A 100 mg. sample of the test compound was micropulverized and was dispersed in 10 ml. of water containing sufficient dispersing agent to hold the test compound in suspension, as for example 0.2 percent of a sodium alkylnaphthalenesulfonate and 2 percent of a ligninsulfonic acid. This dispersion was then sprayed on flats containing the seeds of various weeds and crop plants. The flats were then examined periodically to determine the effect on growth as compared with controls. When the test compounds were applied in the amount of 16 pounds per acre, the results obtained are set forth in the table below. In this table the herbicidal activity values are expressed on a 0–10 scale, 10 indicating maximum herbicidal activity, that is no plant growth, and 0 indicating no herbicidal activity, that is normal plant growth.

| Plant | Methoxy Species | Ethoxy Species |
|---|---|---|
| Alfalfa | 9 | 8 |
| Corn | 9 | 7 |
| Wild Oats | 2 | 0 |
| Cheat Grass | 8 | 2 |
| Foxtail | 4 | 0 |
| Barnyard | 5 | 1 |
| Crabgrass | 8 | 3 |
| Johnson Grass | 7 | 0 |
| Snapbeans | 8 | 4 |
| Yellow Rocket | 10 | 10 |
| Chickweed | 9 | 4 |
| Soybeans | 0 | 1 |
| Pigweed | | 0 |
| Velvet Leaf | 8 | 2 |
| Lamb's-quarters | 9 | 1 |
| Curled Dock | 9 | 10 |

The above data show that 2-sulfanilamido-4-methoxy-1,3,5-triazine and 2-sulfanilamido-4-ethoxy-1,3,5-triazine have significant and useful herbicidal activity against a wide variety of plants. The methoxy compound is especially useful for selective pre-emergence treatment of soybean fields to minimize the growth of unwanted plants while leaving the soybeans substantially unaffected.

For general herbicidal application on a large scale, it is convenient to use a micropulverized mixture of 80 parts of the 2-sulfanilamido-4-methoxy or ethoxy-1,3,5-triazine, 3 parts of sodium alkylnaphthalenesulfonate, 0.5 part of methylcellulose, and 16.5 parts of attapulgite clay (the parts being in each instance by weight) which is readily suspended in appropriate concentration in water for spraying purposes.

This application is a continuation-in-part of my copending application Serial No. 69,786, filed October 18, 1960, which is a division of my copending application Serial No. 14,550, filed March 14, 1960, both now abandoned.

I claim:

2-sulfanilamido-4-phenoxy-1,3,5-triazine.

References Cited in the file of this patent

UNITED STATES PATENTS 2,774,756    Bretschneider et al. _____ Dec. 18, 1956

FOREIGN PATENTS 574,619    Canada _____ Apr. 21, 1959
1,085,761   France _____ Aug. 4, 1954
1,135,848   France _____ Dec. 22, 1956

OTHER REFERENCES

Dudley et al.: J. Am. Chem. Soc., vol. 73, pp. 2999–3004 (1951).